Nov. 24, 1931. B. KWARTIN Re. 18,255

APPARATUS FOR AND METHOD OF PHOTOGRAPHICALLY RECORDING SOUNDS

Original Filed April 2, 1928

INVENTOR
BERNARD KWARTIN
BY H. G. Grover
ATTORNEY

Reissued Nov. 24, 1931

Re. 18,255

UNITED STATES PATENT OFFICE

BERNARD KWARTIN, OF BROOKLYN, NEW YORK, ASSIGNOR TO RADIO CORPORATION OF AMERICA, OF NEW YORK, N. Y., A CORPORATION OF DELAWARE

APPARATUS FOR AND METHOD OF PHOTOGRAPHICALLY RECORDING SOUNDS

Original No. 1,759,580, dated May 20, 1930, Serial No. 266,475, filed April 2, 1928. Application for reissue filed March 26, 1931. Serial No. 525,580.

This invention relates generally to improvements in the art of recording and reproducing sounds and more particularly to an apparatus for and method of photographically recording such sounds upon a photographic film.

In the production of "talking pictures", this being the commonly accepted term used where picture and sound records are recorded simultaneously upon a photographic film or the like, many serious difficulties have been encountered in the various attempts to faithfully record and reproduce the sound impressions, one of the chief difficulties being that it has not been possible heretofore to produce a photographic record of sounds wherein the nuances between sounds of strongest and weakest character have been clearly and distinctly defined. Not only this, but the sounds as reproduced by these photographic records have not been able to approach the quality of the sounds as originally produced by the instrument or voice, this being largely due to the fact that it has not been possible heretofore to record the very delicate overtones which give quality and character to speech and musical sounds.

It is accordingly among the objects of the present invention to overcome and obviate the aforementioned and other difficulties by the provision of an apparatus for photographically recording vocal and musical sounds in such manner that the nuances between sounds of strongest and weakest character are larger, richer and clearer than have been obtainable heretofore.

A further object of this invention is the provision of an apparatus for photographically recording sounds and producing a photographic record which takes into account not only the permissible density variations, but also area variations, in representing the sound being recorded. In this respect, this invention is a marked advance in the art, as I know of no apparatus now in use which takes into account both of these variations, the sound records as produced by apparatus now in general use being dependent either upon variable density or variable area, but not upon both, the result being that the range of the recorded sounds is necessarily not in perfect accord with the range of sounds originally produced by voice or instrument. By means of the present invention, it becomes possible to record upon a single record and reproduce therefrom the strongest and weakest sound effects without the use of exaggerated amplification.

Inasmuch as the photographic film in general use is of necessity restricted in width, considerable difficulty has been experienced in finding sufficient space upon the film in which to record sounds having a considerable range of amplitude variation when the variable area method of sound recording is being used, especially in instances where the same film is used to record both sounds and pictures. Furthermore, in recording by the variable density method, the range of density of the film emulsion is not sufficient to cover the large range of sound amplitude variations. It is accordingly a further object of this invention to provide a means for so recording a sound upon a film that the effect of the variable density striations which make up the record may be increased by varying the width of the sound record without having to increase the actual width of the record upon the film.

A further object of this invention is the provision of a photographically produced sound record, irrespective of and apart from its applicability for talking pictures, which surpasses in its purity of tone and reproduction, those records the photographic representations of which differ only in varying densities or varying areas.

A still further object of the invention is the provision of a shutter arrangement which is operable to intercept portions of and so confine within certain limits, the light rays emanating from an actinic lamp in accordance with the variations in the strength of the sound being recorded, the operation of the shutters being entirely automatic and in synchronism with variations in the actinic intensity of said lamp.

Other objects and objects relating to details of construction and assembly of the apparatus as well as to details in the method of using same will appear more fully hereinafter.

The invention consists substantially in the combination, construction, location and relative arrangement of parts and in the method of using same, all as will appear more fully hereinafter, as shown in the accompanying drawings and finally pointed out in the appended claims. In the said accompanying drawings wherein are shown preferred arrangements embodying the principles of this invention and which drawings are intended solely for illustrative purposes:

Figure 9:
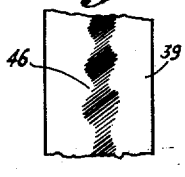
Figure 10:
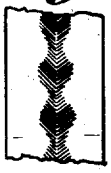
Figure 7:
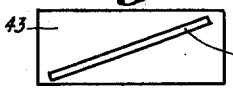
Figure 8:
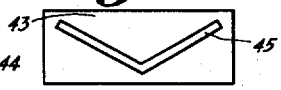

Figures 7 and 8 are front views, respectively, of modified forms of shutter arrangements; and Figures 9 and 10 are enlarged fragmentary views, respectively, of sound records obtained by using the shutter arrangements shown in Figures 7 and 8.

Figure 1:
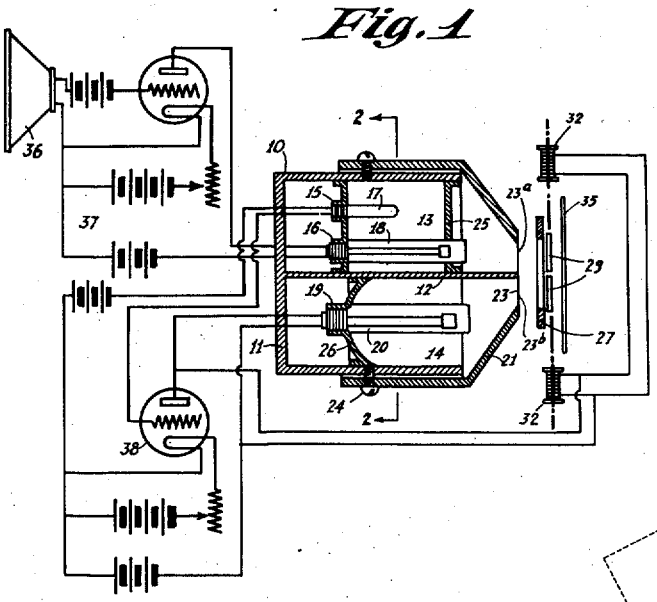
Figure 1 is a diagrammatic view showing an arrangement for photographically recording sounds upon a film in accordance with the principles of this invention.
Figure 2:
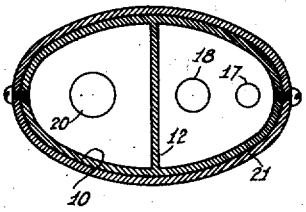
Figure 2 is a cross section taken on the line 2—2 of Figure 1.
Figure 6:
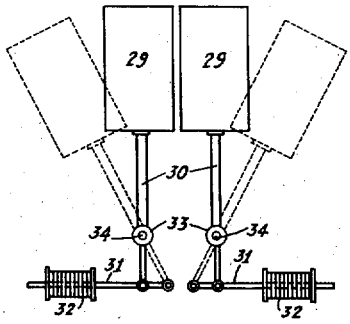
Figure 6 is a front view of that form of shutter arrangement capable of producing the sound record shown in Figures 4 and 5.

Referring to the drawings and more particularly to Figure 1 which shows an apparatus for photographically recording sound effects upon a film, it will be seen that this apparatus comprises a main casing or box 10, the rear end of which is closed, as at 11, while the forward end thereof is open. The casing 10 is preferably of a cross section having a greater width than depth, and extending forwardly from the rear end 11 of the casing is an opaque partition 12, the side edges of which are in engagement with the opposite side walls of the casing. As appears most clearly in Figures 1 and 2, this opaque portion 12 serves to divide the casing into two compartments, namely compartments 13 and 14.

Secured to the rear wall of the compartment 13, in any suitable manner, is a socket 15 and a socket 16, these sockets being arranged to respectively receive a photoelectric cell 17 and a primary actinic lamp 18. Secured to the rear wall of the compartment 14 is a third socket 19, this latter being arranged to receive a secondary actinic lamp 20 which is preferably of greater capacity and larger than the primary actinic lamp 18. It will, of course, be understood that the cell 17 and the lamps 18 and 20 may be maintained in position in any other suitable manner, the important feature being that the photoelectric cell and the primary actinic lamp are arranged in one compartment, while the secondary actinic lamp is arranged within the other compartment.

It will be observed that the opaque partition 12 extends forwardly of and beyond the open end of the casing 10. Arranged to be telescopically received over the forward and open end of this casing 10 is a cap or similar member 21, the forward end 22 of which is of substantially tapered cross section. Provided in the apex of this tapered cap member is an aperture or opening 23. As appears most clearly in Fig. 1, the members 10 and 21 are arranged for assembly together in such manner that the forward edge of the opaque partition 12 terminates in the vertical plane of the transverse slot 23. Securing elements 24 serve to retain the members 10 and 21 in said assembled relation. It will be seen that by reason of this construction, the opening 23 in the end of the member 21 is divided in such manner as to provide separate openings 23*a* and 23*b* arranged to permit the passage therethrough of the light rays which emanate respectively from the primary and secondary actinic lamps 18 and 20.

Surrounding the primary actinic lamp 18 at a point adjacent the forward end thereof is an opaque screen 25, the purpose of which will appear more fully hereinafter. If desirable, and it is believed preferable, the secondary actinic lamp 20 is provided with a suitable reflector 26 arranged for the purpose of directing a more concentrated light from the secondary actinic lamp 20 through the portion 23*b* of the opening 23. Arranged directly in front of this opening 23 is a silver-coated or other opaque screen 27, this screen being provided with a transverse slot 28 in registry with the opening 23 in the cap member 21. By properly proportioning the slot 28 in the screen 27, the width and depth of the beam of light that is commonly directed therethrough by the actinic lamps 18 and 20 may be rigidly held to the proper limits desired. Operatively associated with the opaque screen 27 and arranged forwardly thereof are a pair of pivotally supported shutters or similar devices 29, the combined width of which is sufficient to cover the transverse slot or opening 28 in said screen 27 and thus intercept the light rays emanating from the actinic lamps. Preferably these shutters 29 are each supported upon the upper end of a suitable rod 30, to the lower end of which rod is pivotally secured a laterally extending armature or plunger 31. This laterally extending armature or plunger 31 is operable within a solenoid or similar device 32, this latter being designed, when energized in the manner to be hereinafter explained, to cause said plunger 31 to be drawn into said solenoid, thereby causing the shutter 29 to move to one side with the result that the slot 28 will be uncovered an amount depending upon the extent of movement of said shutter. For this purpose, the rod 30 upon which the shutter 29 is mounted is provided intermediate its upper and lower ends with a collar 33 oscillatable upon a suitable spindle or shaft 34, this construction permitting the shutter 29 to move about the shaft 34 as an axis depending upon the degree to which the solenoid 33 is energized. Inasmuch as each of the shutters 29 is provided with a plunger 31 operable within a solenoid 32, it will be seen that upon simultaneous energization or de-energization of the solenoids the shutters 29—29 will be caused to move away from or toward each other whereby to provide a greater or lesser space between the proximate edges thereof through which the light rays from the lamps 18 and 20 may pass. It will be understood, of course, that the shutters are arranged for movement in the same transverse plane, this plane being normal to that of the opaque partition 12, and it will be further understood that the shutters and the parts operatively associated therewith are arranged symmetrically with respect to the plane of said partition 12.

The operation of the apparatus just described for recording sound effects upon a suitable film 35 will now be more readily understood by referring to Figure 1. These sounds are transmitted in the usual manner to a suitable microphone, designated generally by the reference numeral 36, by means of which the sound vibrations are converted into corresponding electrical variations, which latter are amplified by means of the amplifying circuit 37 to provide amplified energizing currents for the primary actinic lamp 18. By means of this lamp 18, which is preferably of high actinic value, the amplified electrical variations are converted into light variations. These light variations influence the photoelectric cell 17, which latter is arranged to one side of the primary actinic lamp, with the result that a portion of the light rays emanating from said primary actinic lamp are reconverted into corresponding electrical variations, which latter variations, after being amplified in the amplifying circuit 38, are transmitted to the secondary actinic lamp 20, this secondary actinic lamp being larger than the primary actinic lamp. The light variations set up by this secondary actinic lamp, which light variations correspond to the sound vibrations originally impressed upon the microphone 36, are directed through the openings 23 and 28 upon the film 35.

Simultaneously as the light rays from the primary and secondary actinic lamps are directed through the slot 28 upon the film 35, a certain portion of the light rays emanating from the former are also directed upon the photoelectric cell 17. The screen 25, which closely surrounds the end of the primary actinic lamp, effectually precludes any light reflecting back from the film upon the photoelectric cell 17.

As appears most clearly in Figure 1, the solenoids 33 are connected in parallel with each other and with the secondary actinic lamp 20 in such manner that the electrical variations as originally produced by the microphone 36 and which produce the light variations in the actinic lamps 18 and 20 will produce current variations in the solenoids 32 which are in synchronism with said light variations. In other words, the current supplied to the secondary lamp 20 will be at all times of the same strength as that supplied to the solenoids, the result being that simultaneously as a strong beam of light is directed from said lamp through the slot 28 the solenoids will be energized to cause the shutters 29 to move apart a distance which is in accordance with the intensity of the light rays emanating from the lamp. On the other hand, should the rays of light from the lamp 20 be of relatively weak strength, the shutters will automatically approach one another and in so doing will reduce the effective width of the slot 28 through which said rays of light are permitted to pass, this by reason of the fact that the solenoids 32 are energized to the same extent as is the lamp 20. Should no sound whatever be produced with the result that no electrical current is established for energizing the actinic lamps 18 and 20 and the solenoids 32, the latter will not be operative to separate the shutters 29, in which case the shutters will operate conjointly to cover the transverse slot 28 in the screen 27.

It will thus be seen that the shutters 29 operate conjointly to define the width of the slot 28 and so confine the rays of light emanating from the lamps 18 and 20 within certain well defined limits. In other words, this slot 28, through which the light rays are directed upon the film 35, is of a variable effective width depending upon the strength of the sounds impressed upon the microphone 36, this variation in effective width being obtained automatically as the solenoids are energized or de-energized to greater or less extent in the manner already described.

The advantages of this construction will be quite apparent inasmuch as it makes possible the recording of sound effects upon the film 35 in such a form as to take into account not only the differences in the density of the record, but also differences in the width of the record. In those instances where only one or the other of these differences is taken into consideration, the band which makes up the record is either of constant density with the variable area type record or of constant width with the variable density type record. In the record of my invention, which might be called a variable area, variable density type record, the variations in amplitude of the recorded sound can be truly indicated by the variations in the width of the record.

Figure 4:
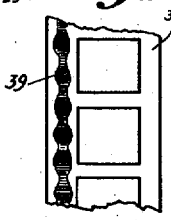
Figure 4 is a fragmentary view of a combined motion picture and sound record embodying the principles of this invention.
Figure 5:
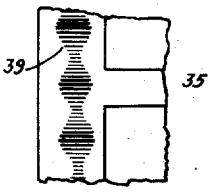
Figure 5 is an enlarged view of a portion of the sound record shown in Figure 4.

Figures 4 and 5 are fragmentary views of sound records which are produced by the apparatus shown in Figure 1. Figure 4 shows the sound record in combination with the picture record. It will be seen from these two figures that the record band 39 varies both in width and in density; that portion of the record having the greatest width having also the greatest density, while those having the least width are of the least density. Such a record is produced due to the provision of the width of the variable slot through which the light rays are directed upon the film 35. Thus, for instance, when a sound of maximum intensity and amplitude is impressed upon the microphone 36, a corresponding electrical current is set up which in turn produces a light of maximum intensity in the lamp 20. At the same time the solenoids 32 are energized to a corresponding degree, thereby causing the shutters 29 to move apart and so provide a slot opening which is of maximum effective width. Due to the particular intensity of the recording light, a band or striation of maximum depth will be recorded upon the film, the record at this point being of maximum width due to the fact that the slot 28 has been uncovered to maximum extent. In a similar manner, the sounds of different strength will be recorded upon the film in the form of a record of varying density and area corresponding to the particular strength of the sound. The light variations emanating from the primary lamp 18 and which pass through the opening 23*a*, being in exact synchronism with those emanating from the secondary lamp 20, serve to supplement the light rays emanating from the latter.

Figure 3:
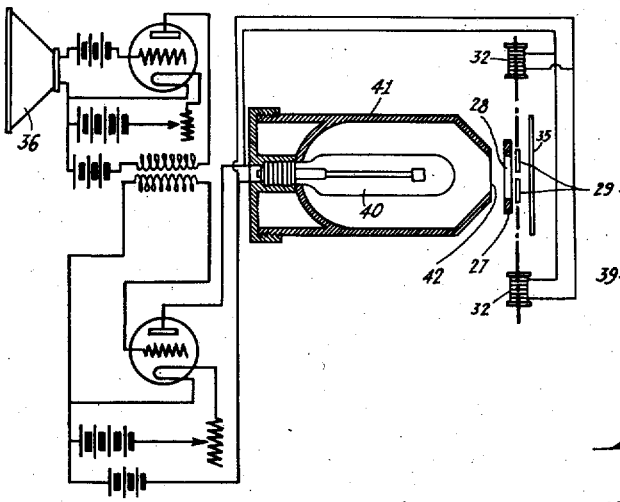
Figure 3 is a diagrammatic view of a modified arrangement for photographically recording sounds upon a film.

In Figure 3, I have shown a modified arrangement which operates in all respects in a manner similar to that shown in Figure 1, the only differences being that in this modification there is no primary actinic lamp as distinguished from a secondary lamp and that the photoelectric cell is eliminated. The sound vibrations which are impressed upon the microphone 36 are converted into electrical variations as before, these electrical variations being sent through two or more stages of amplification before energizing the single actinic lamp 40. This lamp 40 is housed within a suitable opaque casing 41, the forward end of which is apertured, as at 42, this aperture corresponding to the opening 23 in the apparatus shown in Figure 1. In all other respects, the apparatus and its operation is similar to that already described and, therefore, the description thereof need not be repeated herein.

Referring now to Figures 7 and 8, it will be seen that these figures illustrate modified forms of shutters, the purpose of which is to provide a means for so recording a sound record upon a film that the striations which make up the record may be increased in effective width without, however, increasing the transverse width of the film space which has been allotted to said record. To effect this object, the apparatus of either Figure 1 or Figure 3 may be provided with a screen 43 (to be substituted for the screen 27) which is provided with an inclined slot 44, as in Figure 7, or with a V-shaped slot 45, as in Figure 8. In either case it will be apparent that the effective widths of the bands or striations of light recorded upon the film may be increased without necessitating an increase in the cross-wise dimension of the film space normally occupied by the sound record, this space being sometimes only one-tenth that normally occupied by the picture. In those cases where a multiple sound record is made upon the same film and in fact wherever the film space is limited, this arrangement of the bands becomes especially advantageous.

Figures 9 and 10 show, respectively, fragmentary portions of sound records such as may be produced when the inclined slot 44 or the V-shaped slot 45 is employed. It will be observed that in the former instance, the sound record 46 is made up of a series of parallel bands or striations inclined with respect to the horizontal, while in the latter instance the sound record 47 is in the form of a series of substantially V-shaped bands or striations arranged in nested relation. In both forms, the effective widths of the sound bands are greater than those of the bands shown in Figure 5 for the same cross-wise width of the space occupied by the sound record.

It will be understood that various changes and modifications of the arrangements of apparatus for and methods of recording sound effects photographically upon a film as disclosed and described herein may be made without departing from the spirit or principles of this invention, and it is accordingly intended to claim the same broadly, as well as specifically, as indicated by the appended claims.

I claim:

1. An apparatus for photographically producing a sound record upon a photographic film comprising means responsive to sound variations for producing light rays differing in intensity in accordance with the sound variations, an opaque member having a slot of given depth and width through which said light rays pass, and means operative in accordance with said sound variations for varying the effective width of said slot without affecting the depth thereof.

2. An apparatus for photographically producing a sound record upon a photographic film comprising a sound responsive device, a sound recording device actuated by said sound responsive device for recording the sounds upon the film, and means operating indepedently of but in synchronism with said devices for varying the width of the individual sound impressions produced upon said film without varying the depth thereof.

3. An apparatus for photographically producing a sound record upon a photographic film comprising a sound responsive device, a light projecting element actuated by said sound responsive device for recording the sounds upon a film, a casing enclosing said light projecting element and having an opening of a given width and depth through which the light rays emanating from said element may be directed upon the film, and means for varying the effective width of said opening in accordance with intensities of the light rays projected therethrough.

4. In apparatus for photographically recording sounds upon a photographic film comprising means responsive to sound variations for establishing fluctuating electric currents varying in intensities in accordance with the sound variations, means influenced by said electrical currents for emitting light variations corresponding to said electrical variations, a continuously moving film upon which said light variations are individually recorded in the form of vertically spaced striations of uniform dimensions considered lengthwise of the film, and means interposed between said film and said latter means operative to vary the transverse dimensions of said striations without affecting said uniform dimensions thereof in accordance with the intensities of the light variations respectively producing said striations.

5. An apparatus for photographically recording sounds upon a photographic film comprising means responsive to sound variations for establishing fluctuating electrical currents varying in intensities in accordance with the sound variations, means influenced by said electrical currents for emitting a beam of light fluctuating in accordance with said electrical variations, a casing for enclosing said light emitting means, said casing being provided with a slot a given depth and width through which the beam of light may be projected, a continuously moving film arranged to intercept said projected beam of light whereby to record the sounds thereon, and means for varying only the effective transverse dimension of said slot in accordance with the intensities of the sounds as originally produced.

6. In an apparatus for photographically recording sounds upon a photographic film, means responsive to sound variations for producing upon a film a series of sound records, and means operating independently of but in synchronism with said sound responsive means for causing said records to assume the form of a uniformly spaced vertical line of bands each of which is of a transverse dimension corresponding to the intensity of the particular sound of which it is a record and all of which are of the same dimension considered lengthwise of the film.

7. In an apparatus for photographically recording sounds upon a photographic film, means responsive to sound variations for producing upon a film a series of sound records, and means operating independently of but in synchronism with said sound responsive means for causing said records to assume the form of a vertical line of uniformly spaced bands or striations of the same vertical dimensions but differing in transverse dimensions in accordance with the variations in intensity of the sounds of which said bands or striations are records.

8. In an apparatus for photographically recording sounds upon a photographic film, means responsive to sound vibrations for producing upon a film a series of sound records, and means operating independently of but in synchronism with said sound responsive means for recording said sound vibrations in the form of bands or striations of varying widths and degrees of shading but of uniform dimensions when considered lengthwise of the film.

9. In an apparatus for photographically recording sounds upon a photographic film, means responsive to sound variations for recording the same upon a film, and means operative independently of but in synchronism with said sound responsive means for causing the sound record to assume the form of a series of sound bands or striations of varying transverse widths and degrees of shading, the width of any one of said bands or striations being greater for a greater degree of shading and less for a lesser degree of shading and all of said bands or striations being of the same longitudinal dimension.

10. An apparatus for photographically recording sounds upon a photographic film comprising a light producing element responsive to electrical variations corresponding to sound vibrations of varying amplitudes and intensities, means for directing the light rays emanating from said element upon a film whereby to produce a photographic record of the sounds thereon, and means including a pair of pivotally mounted shutters operatively associated with said element and responsive to said electrical variations for confining said light rays between varying transverse limits in accordance with and as determined by the varying intensities of the sounds as originally produced.

11. An apparatus for photographically recording sounds upon a photographic film comprising a light producing element responsive to electrical variations corresponding to sound vibrations of varying amplitudes and intensities, and means including a pair of shutters operatively associated with said element and responsive to said electrical variations for intercepting more or less of the light rays emanating from said element as the sound vibrations decrease or increase in intensity, said shutters being movable in a common plane traversing said light rays and paralleling said film.

12. An apparatus for photographically recording sounds upon a photographic film comprising a light producing element responsive to electrical variations, a casing in which said element is housed, said casing being provided with an opening of a given depth and width through which the light from said element may be projected, and means arranged externally of said casing and responsive to said electrical variations for varying the effective width of said opening without affecting the depth thereof.

13. An apparatus for photographically recording sounds upon a photographic film comprising a light producing element responsive to electrical variations, means for confining the light rays emanating from said element within certain definite vertical and transverse limits, and further means responsive to said electrical variations for changing said transverse limits to record with said electrical variations without affecting said vertical limits.

14. An apparatus for photographically recording sounds upon a photographic film comprising a light responsive element responsive to electrical variations, an opaque screen located in front of said element and having an opening of certain depth and width through which the light rays emanating therefrom may be directed upon a film, and one or more shutters operatively associated with said screen for varying the effective width of said opening without affecting the depth thereof, said shutters being responsive to the same electrical variations which influence said light responsive element.

15. An apparatus for photographically producing a sound upon a photographic film comprising means responsive to sound variations for producing light rays which differ as to magnitude in accordance with said variations, an opaque member having a given depth and width through which said light rays pass, and means operative in accordance with said variations for varying the effective width of said slot without affecting the depth thereof.

16. An apparatus for photographically recording sound upon a photographic film comprising means for converting said sound into electrical impulses, means for amplifying said impulses and converting them into light modulated in accordance with said sound, an opaque member having a slot through which said modulated light passes, and means operative in accordance with said electrical impulses for varying a dimension of said slot.

BERNARD KWARTIN.